United States Patent [19]

Mehra et al.

[11] Patent Number: 5,326,929
[45] Date of Patent: * Jul. 5, 1994

[54] ABSORPTION PROCESS FOR HYDROGEN AND ETHYLENE RECOVERY

[75] Inventors: Yuv R. Mehra, The Woodlands, Tex.; Wilfred K. Lam, Arcadia; Dow W. Mullins, Glendora, both of Calif.

[73] Assignee: Advanced Extraction Technologies, Inc., Houston, Tex.

[*] Notice: The portion of the term of this patent subsequent to Jun. 15, 2010 has been disclaimed.

[21] Appl. No.: 937,156

[22] Filed: Aug. 31, 1992

Related U.S. Application Data

[63] Continuation-in-part of Ser. No. 836,911, Feb. 19, 1992, Pat. No. 5,220,097.

[51] Int. Cl.$^5$ .............. C07C 7/00; F25J 3/00; B01D 19/00
[52] U.S. Cl. ................... 585/809; 585/833; 62/17; 62/24; 95/177
[58] Field of Search ............ 585/809, 833; 62/17, 62/24; 55/68, 69

[56] References Cited

U.S. PATENT DOCUMENTS

| | | | |
|---|---|---|---|
| 2,938,934 | 5/1960 | Williams | 260/677 |
| 4,654,063 | 3/1987 | Auvil et al. | 62/18 |
| 4,740,222 | 4/1988 | Mehra | 62/17 |
| 4,743,282 | 5/1988 | Mehra | 62/17 |
| 4,832,718 | 5/1989 | Mehra | 62/17 |
| 5,019,143 | 5/1991 | Mehra | 62/17 |
| 5,220,097 | 6/1993 | Lam et al. | 585/809 |

OTHER PUBLICATIONS

"Comparison of the Mehra Process for Nitrogen Rejection to a Cryogenic Process for Nitrogen Rejection from Subquality Natural Gas", Report GRI-90/290, Gas Research Institute pp. 1-62 (1991).

"KTI Symposium 1991–An Improved Ethylene Process", by Wilfred K. Lam et al, unpublished paper delivered during the KTI Symposium held at Kerhaus, The Netherlands, on Oct. 9, 1991, pp. 1–16.

"KTI/AET offer cracker design for the future", European Chemical News, Oct. 14, 1991, p. 26.

*Primary Examiner*—Anthony McFarlane
*Assistant Examiner*—Nhat D. Phan
*Attorney, Agent, or Firm*—Depaoli & O'Brien

[57] ABSTRACT

A continuous process is described for contacting an olefins-containing feed gas stream, which has been freed of $CO_2$ and sulfur compounds, compressed, cooled, and dried, with a solvent in an intercooled and reboiled demethanizing absorber to produce a rich solvent bottom stream containing ethylene and heavier hydrocarbons and an absorber overhead stream which is fed to a methane absorber which recovers a hydrogen product stream as overhead and produces a rich solvent stream as bottoms. When recovering up to 50% of the incoming hydrogen, this rich solvent stream from the methane absorber is fed to the demethanizing absorber, but when recovering from 20% to 100% of the incoming hydrogen, this rich solvent stream is recycled in part to the demethanizing absorber and in part is fed to a methane stripper which sends its bottoms to the methane absorber and its overhead to an auto refrigerated recovery unit which removes $H_2$, $CH_4$, and CO as a fuel gas product and produces an ethylene and heavier stream. The rich solvent stream from the demethanizing absorber is separated in a solvent regenerator into an overhead stream of ethylene and heavier hydrocarbons and a bottom lean solvent stream for recycle to the methane absorber and then to the demethanizing absorber. The bottom stream of the recovery unit and the overhead stream of the solvent regenerator are combined to form an ethylene and heavier product stream.

20 Claims, 2 Drawing Sheets

ABSORPTION PROCESS FOR HYDROGEN AND ETHYLENE RECOVERY

CROSS-REFERENCE TO RELATED APPLICATION

This is a continuation-in-part of U.S. patent application Ser. No. 07/836,911, filed Feb. 19, 1992, now U.S. Pat. No. 5,220,097, the subject matter of which is hereby incorporated by reference.

BACKGROUND OF THE INVENTION

1. Field of the Invention

This invention relates to recovery of hydrogen pyrolyzed hydrocarbon gases and/or refinery off-gases and especially relates to recovery of hydrogen by absorption with a preferential physical solvent from de-acidified, compressed, and dried hydrocarbon gases containing olefins.

2. Review of the Prior Art

Hydrogen is present in large quantities in thermally or catalytically cracked gas streams or in refinery off-gases and is commonly associated with olefins, such as ethylene and propylene. In addition to hydrogen, these gases generally comprise methane, carbon monoxide, carbon dioxide, acetylene, ethane, methyl acetylene, propadiene, propylene, propane, butadienes, butenes, butanes, $C_5$'s, $C_6$-$C_8$ non-aromatics, benzene, toluene, xylenes, ethyl benzene, styrene, $C_9$–400° F. gasoline, 400+° F. fuel oil, and water.

Numerous processes are known in the solvent absorption art for isolation and recovery of olefins from cracked, refinery, and synthetic gases containing these unsaturated compounds. Some processes utilize specific paraffinic compounds as an absorption oil, and others utilize an aromatic absorption oil as a solvent within an absorber column or an absorber-stripper column having a reboiler.

Thermal cracking of hydrocarbon feedstocks in pyrolysis furnaces for production of ethylene has been an established technology since the 1940's. The pyrolysis furnace gases were sent to the recovery section of an ethylene plant in which the first fractionation column was a front-end demethanizer operating at about −150° C. The de-acidified, compressed, dried, and chilled pyrolysis gases were fed to the demethanizer after five compression stages to 500 psia. The demethanizer bottoms were fed to a deethanizer, and the demethanizer overhead, rich in hydrogen, was fed to a cryogenic unit which recovered additional ethylene from the fuel gas stream. A back-end acetylene removal system, such as a series of two acetylene reactors, was typically located between the deethanizer and the C2 splitter or between the depropanizer and the C3 splitter. This arrangement caused the production of large amounts of green oil, a polymer formed from olefins and diolefins, which was likely to freeze in the C2 splitter or accumulate in the ethane vaporizer.

The parent application avoids this problem by processing overhead gases from a heatpumped deethanizer or depropanizer, which is coupled with a front-end catalytic acetylene hydrogenation reactor, in an absorber-stripper configuration capable of recovering 75% to 95% of contained ethylene from the reactor effluent gases and subsequently processing the overhead gases from the absorber-stripper column to recover the contained solvent and remaining 5% to 25% of ethylene in a tail-end demethanizer.

The process of the parent application can be applied to all feedstocks for any conventional ethylene plant, but it is exemplified in the application by using a full range naphtha feedstock for a plant with a front-end depropanizer.

In this plant, the naphtha feedstock is vaporized and sent to the pyrolysis furnaces, and the furnace effluent is indirectly quenched in transfer-line exchangers before direct quench in the oil quench tower. Fuel oil fractions are produced from the quench system. Heat recovery from the hot furnace effluent is accomplished in the oil quench system by heat exchange with other process loads and generation of dilution steam.

The oil quench tower overhead is cooled further in the water quench system where the dilution steam is condensed. Heat is recovered from the circulating quench water by heat exchange with other process loads, especially the regeneration column feed preheating load so that there is an energy synergism within the overall system.

The cooled water quench tower overhead is compressed in three stages to the operating pressure of the front-end deethanizer/depropanizer. At the cracked gas compressor third stage discharge, acid gases are removed by a combination of amine and/or caustic systems. The acid gas-free cracked gas is then dried before entering the fractionation section of the plant.

A low-pressure debutanizing stripper is located in the compression train to remove C5 and heavier fractions from the cracked gas. No high-pressure stripper is required in the compression train.

A front-end heat pumped deethanizer/depropanizer system is coupled with a front-end selective catalytic acetylene hydrogenation reactor system. The front-end heat pumped depropanizer permits fractionation at low pressure and condensation at high pressure. Fouling is minimized when the depropanizer is operated at low pressure.

The energy for heat pumping of the deethanizer/depropanizer is provided by the fourth stage of the cracked gas compressor. At the compressor discharge, acetylene is selectively hydrogenated to ethylene in the front-end reactor system. In addition, heaver $C_3$ and $C_4$ acetylenes and diolefins contained in the depropanizer overhead are selectively hydrogenated to their respective olefins, resulting in overall olefin gains across the reactor system. No green oil is formed across this reactor system.

The acetylene-free C3-and-lighter portion of the cracked gas leaves the reactor and is dried in a dehydrator to remove trace quantities of moisture. This C3-and-lighter fraction leaves the depropanizer reflux drum and enters the solvent extraction system for recovery of C2-plus hydrocarbons.

The C3-and-lighter fraction is fed to the absorber column. The C2's and C3's are absorbed by the solvent while methane and lighter components, together with some ethylene, leave the top of the absorber. This overhead stream is fed to a small tail-end demethanizer where essentially all the C2's are recovered. Additionally, any solvent present in the absorber overhead is recovered and returned to the absorber. The demethanizer is auto refrigerated by means of turbo expanders. No external refrigeration is required for the tail-end demethanizer.

The rich solvent from the bottom of the absorber is fed to a solvent regenerator where the demethanized C2's and C3's are recovered as overhead product. The lean solvent is returned to the absorber after heat recovery.

The C2's and C3's are further separated in a conventional deethanizer to produce a C2 and a C3 fraction. These two fractions are then processed in their respective superfractionators to produce polymer grade ethylene and propylene products. Ethane and propane leaving their respective superfractionators (i.e., $C_2$ and $C_3$ splitters) as bottom products are recycled and cracked to extinction in the pyrolysis furnaces. Back-end acetylene hydrogenation reactors are eliminated.

The C4-plus fraction leaving the bottom of the heat pumped depropanizer is fed to a conventional debutanizer to produce a C4 mix as overhead product. The bottom product from the debutanizer is combined with the bottoms from the low pressure stripper in the compression train and sent to the pyrolysis gasoline hydrotreater.

External refrigeration for the ethylene recovery process of the parent application is supplied only by a propylene refrigeration compressor. No ethylene refrigeration is required by the ethylene recovery process.

Any solvent that is useful for absorbing hydrocarbons is suitable as the absorbent in the intercooled and reboiled demethanizing absorber. Such solvents include, but are not limited to, any of the solvents identified in earlier Mehra patents for use in all embodiments of the Mehra process.

The process of the parent application is equally as useful for treating refinery off-gases as it is for treating cracked gases because its versatility enables it to be readily adapted to the great variety of such refinery feeds.

However, the process of the parent application does not provide a means for isolating and recovering even a portion of the large quantities of hydrogen which are typically present in thermally or catalytically cracked gases and in refinery offgases. All of the hydrogen in such gases is discharged as a part of its fuel gas product. There is accordingly a need for a method and a means for recovering this hydrogen.

U.S. Pat. No. 2,938,934 of R. B. Williams describes a process for recovery of ethylene which comprises successively compressing, cooling, and fractionating a gas mixture to remove $C_{4+}$ hydrocarbons as a first bottom stream and then $C_2/C_3$ hydrocarbons as a second bottom stream which is fractionated to send $C_3$ hydrocarbons to storage and to form an overhead stream which is hydrogenated and fed to a $C_2$ splitter, the second overhead being cooled and partially liquefied to isolate a stream of hydrogen and methane which is fed to a methane absorber utilizing ethane as the solvent for methane, thereby isolating hydrogen for the hydrogenation operation.

U.S. Pat. No. 4,654,063 of Auvil et al discloses a process for recovering up to about 98% pure hydrogen from a diversity of hydrogen-containing gas streams by feeding such a gas mixture to a suitable non-membrane separation unit for treatment and separation to produce a hydrogen-enriched stream and a hydrogen-depleted stream. The non-membrane separation unit can be an adsorption, absorption, cooling, or partial condensation and/or rectification type unit. At least a portion of the hydrogen-enriched stream is fed to a membrane unit in which it is separated to form a hydrogen-rich permeate stream and a hydrogen-lean reject stream which is recycled to the nonmembrane separation unit.

U.S. Pat. No. 4,740,222 of Y. R. Mehra discloses a process for countercurrently extracting a hydrogen-containing inlet gas stream with a lean solvent stream to produce an overhead stream of at least 90% purity hydrogen and a bottom stream of rich solvent which is flashed in one or more stages. The flashed gas from at least the first stage, after compression, is recycled to the extracting step. The flashed gases from the remaining stages are recovered as fuel gas. When a hydrogen purity of more than 95% is needed, a minor portion of the stripped solvent from the last flashing stage is regenerated in a distillation column to form very lean solvent which is fed to the top of the extractor column while the major portion of the stripped solvent is fed to its middle.

U.S. Pat. No. 4,743,282 of Y. R. Mehra describes a process for treating cracked gases which have been compressed, cooled, sweetened, and dried to produce a $C_2=+$ hydrocarbons product, a methane-rich gas product, and a $H_2$-rich gas product by successive countercurrent extraction with two lean solvents in separate loops.

U.S. Pat. No. 4,832,718 of Y. R. Mehra teaches a method for hydrogen purification by countercurrently and successively extracting an olefins containing gas stream, at a pressure no greater than 500 psi, in an ethylene extractor column with a solvent slip stream from at least one flashing stage and then with lean solvent in a methane extractor column.

U.S. Pat. No. 5,019,143 of Y. R. Mehra describes a continuous process for contacting a hydrogen off-gas stream, at any pressure, in a demethanizing-absorber column, having at least one reboiler, with a main stream of stripped physical solvent and then with a cleanup stream of lean solvent.

The following patents of Yuv R. Mehra U.S. Pat. Nos. 4,421,535; 4,511,381; 4,526,594; 4,578,094; 4,601,738; 4,617,038; 4,623,371; 4,692,179; 4,680,042; 4,696,688; 4,740,222; 4,743,282; 4,832,718; 4,883,514 and 5,019,143 are incorporated herein by reference.

SUMMARY OF THE INVENTION

It is accordingly an object of this invention to provide a method for recovering at least a portion of the hydrogen isolated in the overhead stream of a demethanizing absorber, hereinafter identified as an absorption column having intercooling and reboiling, from the vapor stream of a front-end depropanizer or deethanizer being fed to the demethanizing absorber.

It is an additional object to provide a method for recovering substantially all of the hydrogen isolated by the demethanizing absorber.

It is a further object to provide a method for recovering all of this hydrogen at a selected degree of purity.

It is also an object to provide a method for recovering substantially all of the solvent used by the demethanizing absorber.

It is another object to provide a method for recovering substantially all of the ethylene and propylene in the vapor stream being fed to the demethanizing absorber.

It is yet another object to provide a method for shifting the production of hydrogen product for an entire plant from a very small percentage of the incoming hydrogen to substantially 100% hydrogen production while changing only the composition of the fuel gas product stream and without disturbing the $C_2/C_3$ product stream.

In accordance with the principles of this invention, it has been discovered that the overhead from a demethanizing absorber can be selectively split into a hydrogen portion and a fuel portion to recover therefrom a portion of the contained hydrogen as product. Due to the splitting of the gas stream, the percentage recovery of hydrogen is accordingly limited. For the purpose of functionally distinguishing between the slipstream and the fullstream embodiments of the process, by either of which hydrogen can be selectively produced, the slipstream embodiment will be described as recovering up to 50% of hydrogen. It should be recognized, however, that this is a practical choice and not a process limitation.

It should further be recognized that the hydrogen purity increases with increasing solvent circulation for the same hydrogen recovery level. Correspondingly, for a given purity, hydrogen recovery can be increased by increasing solvent circulation.

For the slipstream hydrogen embodiment, the overhead stream from the demethanizing absorber can be selectively split into hydrogen and fuel portions to produce up to 50% of the contained hydrogen as a product. More specifically, the hydrogen portion is fed to a methane absorber wherein hydrogen is produced as the overhead product stream and a methane-rich solvent bottom stream is produced that is fed to the top of the demethanizing absorber. The remainder of the overhead stream from the demethanizing absorber is fed directly to an auto refrigerated recovery unit in which a fuel gas stream, containing methane and carbon monoxide, is separated from a $C_2/C_3$ bottom stream and from a small rich solvent stream which is recycled to the demethanizing absorber.

The rich solvent bottom stream from the demethanizing absorber is fed to a solvent regenerator which produces an overhead stream containing all $C_{2+}$ hydrocarbon components and a lean solvent bottom stream which is fed to the top of the methane absorber. This $C_{2+}$ overhead stream is combined with the $C_2/C_3$ bottom stream from the auto refrigerated recovery unit to form an ethylene/propylene product stream for feeding to a deethanizer and a $C_2$ splitter.

The entire slipstream embodiment functions on one solvent loop, the circulation rate of which is determined by the $C_2$- content of the inlet gas to the demethanizing absorber column, beginning with the lean solvent entering at the top of the methane absorber, then entering the demethanizing absorber, followed by the solvent regenerator which produces the lean solvent.

It has further been discovered, as a fullstream hydrogen embodiment, that by initially processing the entire overhead stream of the demethanizing absorber in the methane absorber, its overhead stream can be efficiently produced as a hydrogen product stream. A hydrogen-poor rich solvent stream, as the bottom stream from the methane absorber, is selectively split into minor and major portion streams; the minor solvent stream is fed to the demethanizing absorber and the major portion stream is fed to a methane stripper. The bottom stream from the methane stripper is recycled as main solvent to the methane absorber, and the methane-rich and hydrogen-poor overhead stream from the methane stripper is fed to the auto refrigerated recovery unit which functions in the same way as for the slipstream embodiment. Contrary to the slipstream embodiment, wherein the overhead stream from the demethanizing absorber is split between the methane absorber and the auto refrigerated recovery unit, in the fullstream embodiment, the rich solvent bottom stream from the methane absorber is split between the demethanizing absorber and the methane stripper.

Purification in the solvent regenerator of the rich solvent from the demethanizing absorber is also done in the same way as in the slipstream embodiment, all lean solvent being recycled to the top of the methane absorber and the bottom stream from the auto refrigerated recovery unit and the overhead stream from the solvent regenerator also being combined in the same way. The fullstream embodiment functions on two solvent loops, the minor loop circulating through the methane absorber, the demethanizing absorber, and the solvent regenerator, and the major loop circulating through the methane stripper and the methane absorber.

The flowrate for the minor solvent circulation loop is determined by the $C_{2+}$ content of the inlet gas to the demethanizing absorber column. The flowrate of the major solvent circulation loop is determined by subtracting the minor lean solvent stream produced by the solvent regenerator from the total circulation required to absorb the contained methane in the overhead of the demethanizing absorber column.

The slipstream embodiment can be used for selectively producing up to 50% of the incoming hydrogen, and the fullstream embodiment can be used for selectively producing from 20% to 100% of the incoming hydrogen. With the methane stripper in place and pipelines constructed for feeding any desired amounts of demethanizing absorber overhead to the methane absorber or to the auto refrigerated recovery unit and/or for sending the methane absorber bottoms in part or entirely to the demethanizing absorber or in part to the methane stripper, and/or for sending the solvent regenerator bottoms in part or entirely to the methane absorber or in part to the demethanizing absorber, it is feasible to shift the entire plant to production of hydrogen product at from 5%, for example, to 100% of the incoming hydrogen, depending upon market demand for hydrogen gas or the need for reformate hydrogen, hydrocracking hydrogen, and the like in a nearby refinery or a petrochemical plant while changing only the composition of the fuel gas product stream and without disturbing the $C_2/C_3$ product stream.

The means for performing this shift in hydrogen production in accordance with market demand and without affecting the production of olefins comprises: (1) selective splitting of the overhead gas stream from the demethanizing absorber between the methane absorber and the auto refrigerated recovery unit, (2) selective splitting of the rich solvent bottom stream from the methane absorber between the demethanizing absorber and the methane stripper, and (3) selective splitting of the lean solvent bottom stream from the regenerator between the demethanizing absorber and the methane absorber.

As hydrogen recovery approaches zero, the first (gas) splitting approaches 100% flow to the auto refrigerated recovery unit, thereby tending to follow the flow pattern of the parent application, the second (rich solvent) splitting approaches 100% flow to the demethanizing absorber, and the third (lean solvent) splitting also approaches 100% flow to the demethanizing absorber. As hydrogen recovery approaches 100%, the first splitting approaches 100% flow to the methane absorber, the second splitting approaches 65 to 85% flow to the methane stripper, and the third splitting approaches 100% flow to the methane absorber.

DESCRIPTION OF THE PREFERRED EMBODIMENTS

Figure 1:
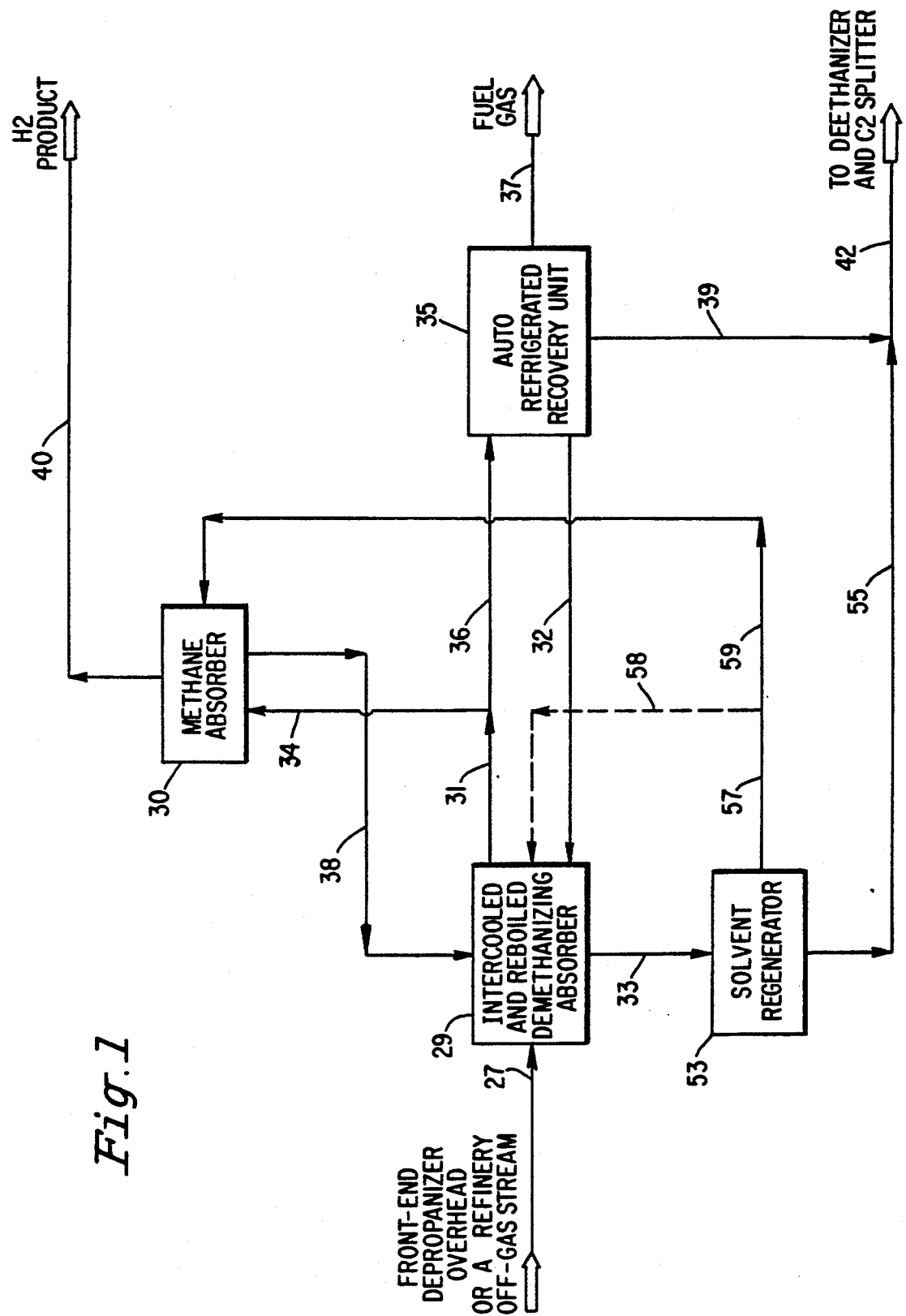
FIG. 1 is a schematic flow diagram of the slipstream embodiment for recovering up to 50% of the hydrogen in the overhead gas stream from a front-end heat pumped depropanizer or a refinery off-gas stream.
Figure 2:
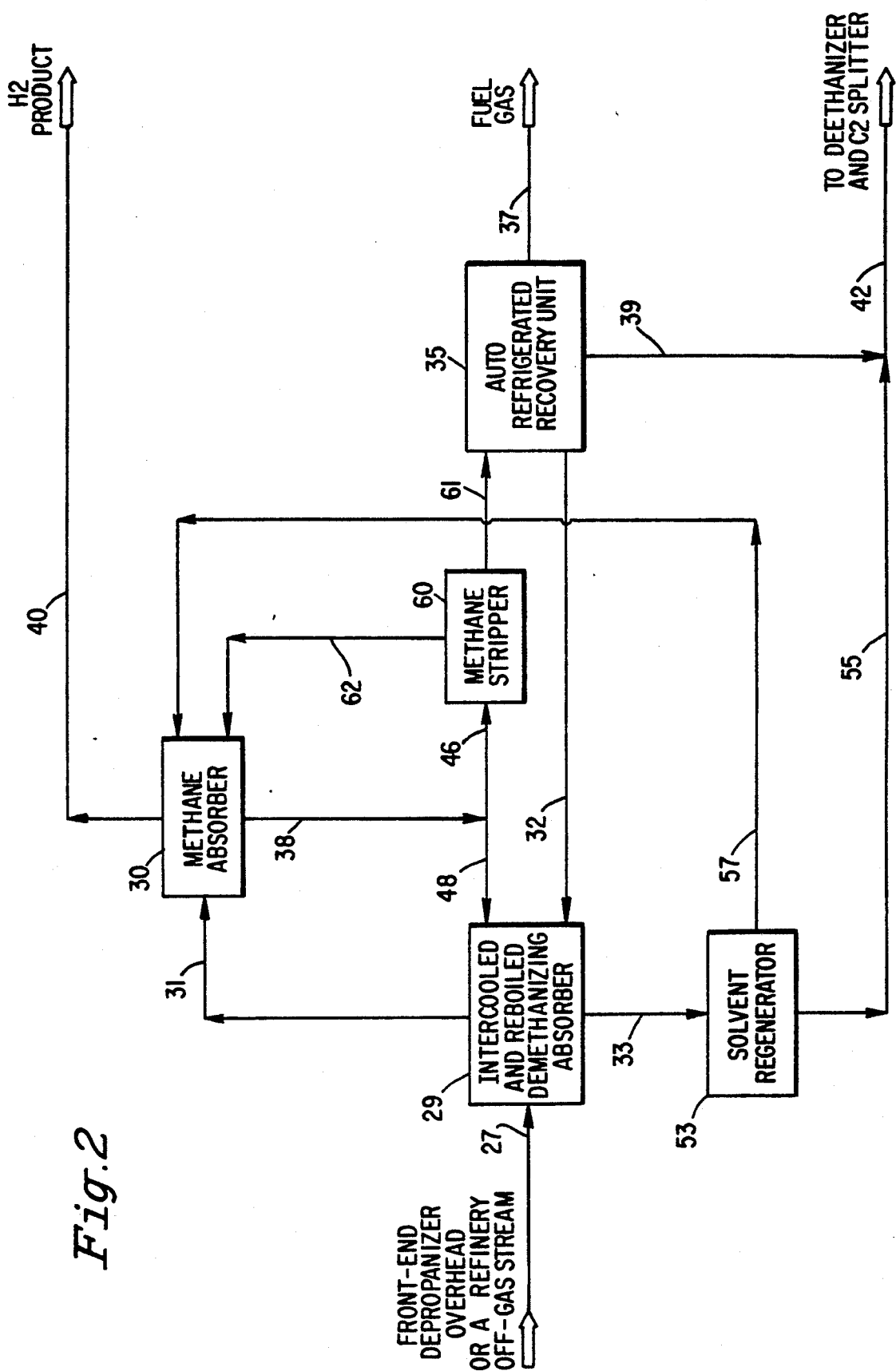
FIG. 2 is a schematic flow diagram of the fullstream embodiment for recovering 20 to 100% of the hydrogen in the same gas stream.

With reference to FIGS. 1 and 2, it should be understood that pipelines are in fact being designated when streams are identified hereinafter and that streams are intended, if not stated, when materials are mentioned. Moreover, flow-control valves, temperature regulatory devices, pumps, and the like are to be understood as installed and operating in conventional relationships to the major items of equipment which are shown in the drawings and discussed hereinafter with reference to the continuously operating process of this invention. All of these valves, devices, and pumps, as well as heat exchangers, accumulators, condensers, and the like, are included in the term, "auxiliary equipment". The term, "absorber", is conventionally employed for a gas/solvent absorbing facility, but when it is utilized in the process of this invention with a preferential physical solvent, it is considered to be an "extractor". An absorber is also to be understood as an absorption column, and a stripper is to be understood as a distillation column.

FIG. 1 schematically represents the slipstream embodiment of this invention for production of selected percentages, up to 50%, of the hydrogen in feedstock stream 27 while maintaining full recovery of $C_2$ and $C_3$ olefins. This result is accomplished by utilizing intercooled and reboiled demethanizing absorber 29, methane absorber 30, solvent regenerator 53, and auto refrigerated recovery unit 35. The process specifically comprises feeding front-end deethanizer or depropanizer overhead vapor or a refinery off-gas, such as from an FCC unit, as stream 27, which consists of sweetened, compressed, and dried saturated and unsaturated hydrocarbon gases, to demethanizing absorber 29 which also receives streams 32 and 38. Its bottom stream 33 is fed to solvent regenerator 53 which produces overhead stream 55 and bottom stream 57 of lean solvent.

At hydrogen recoveries up to 50%, overhead stream 31 from demethanizing absorber 29 is selectively split into streams 34 and 36 in accordance with market considerations. Methane absorber 30 receives at least a portion of bottom stream 57, as stream 59, from solvent regenerator 53. The remaining portion, as stream 58, is fed directly to demethanizing absorber 29, especially when operating at low recoveries of hydrogen. Methane absorber 30 produces overhead stream 40, as the hydrogen product stream of the process, and bottom stream 38 of rich solvent, which is fed directly to the top of absorber 29 when operating at relatively low hydrogen recoveries, herein defined as up to 50%.

Stream 36 is fed to auto refrigerated recovery unit 35 which produces stream 37 as the fuel gas product, stream 32 of recovered solvent which is recycled to absorber 29, and stream 39 of demethanized ethylene-plus hydrocarbons which is joined by overhead stream 55 to form product stream 42 of demethanized $C_2$ and $C_3$ unsaturated and saturated hydrocarbons for feeding to a deethanizer and then to a $C_2$ splitter.

FIG. 2 schematically represents the fullstream embodiment of this invention for production of selected percentages, between 20% and 100%, of the hydrogen in feedstock stream 27 while maintaining full recovery of $C_2$ and $C_3$ olefins. This result is accomplished by utilizing methane stripper 60 in conjunction with the same demethanizing absorber 29, methane absorber 30, solvent regenerator 53, and auto refrigerated recovery unit 35 as in the slipstream embodiment shown in FIG. I. The fullstream embodiment specifically comprises feeding front-end deethanizer or depropanizer overhead vapor or a refinery off-gas, such as from an FCC unit, as stream 27 to demethanizing absorber 29 which also receives streams 32 and 48. Bottom stream 33 is fed to solvent regenerator 53 which produces overhead stream 55 and bottom stream 57 of lean solvent.

Overhead stream 31 is not split but is fed directly to methane absorber 30 which also receives bottom stream 57 of lean solvent from solvent regenerator 53 and stream 62 of regenerated solvent from the bottom of methane stripper 60. Overhead stream 40 from methane absorber 30 leaves the unit as the hydrogen product.

Stream 38 is split into two portions: stream 48 which is recycled to demethanizing absorber 29 and stream 46 which is fed to methane stripper 60, the relative amount of stream 46 being determined according to absorption demands in methane absorber 30 and the amount of stream 48 being determined according to absorption demands in demethanizing absorber 29.

Overhead stream 61 of methane stripper 60 is fed to auto refrigerated recovery unit 35 which produces stream 37 as the fuel gas product, stream 32 of recovered solvent which is recycled to absorber 29, and stream 39 of demethanized ethylene plus hydrocarbons which is joined by overhead stream 55 to form product stream 42 of demethanized $C_2$ and $C_3$ unsaturated and saturated hydrocarbons for feeding to a deethanizer and then to a $C_2$ splitter.

The process of this invention provides a new method for keeping down solvent circulation because demethanizing absorber 29 recovers about 75-99% of contained ethylene from feed stream 27 which is essentially free of $C_{4+}$ hydrocarbons, removes only the $C_2$s and $C_3$ s therefrom, and sends substantially the hydrogen and methane to methane absorber 30, thereby requiring internal cryogenic cooling of only the remaining gases fed to auto refrigerated recovery unit 35 in order to first recover excess solvent as stream 32 and also to recover remaining ethylene, which amounts to 1-25% of the ethylene in the incoming feed gases, as demethanized stream 39.

Additionally, the demethanizing column within auto refrigerated recovery unit 35 recovers any remaining solvent which leaves the process in stream 42 and eventually is recycled with the ethane and propane stream to the cracking operation.

This major portion of ethylene recovery through demethanizing absorber 29 depends upon the specific plant economic situation, feedstock composition and costs, capital and operating cost factors, and the like.

Stream 38 to stream 46 to stream 62 forms a large solvent loop, the solvent therein by-passing demethanizing absorber 29 and regenerator 53. Methane stripper 60 may be composed of a fractionating column or multiple flashing stages or any combination thereof. The solvent in this additional loop is sufficiently regenerated in methane stripper 60 for the purpose of methane absorption and need not enter solvent regenerator 53. Even though all of the truly lean solvent from solvent regenerator 53 is being fed to methane absorber 30 in order to absorb the greatly increased amount of methane in stream 31 of FIG. 2, as compared to the amount in stream 34 of FIG. 1 for the slipstream embodiment, the large quantity of sufficiently lean solvent in bottom stream 62 represents considerable assistance for meeting this additional absorption demand.

The invention may be more fully understood by reference to the following Example 1 which refers to FIG. 1 and Table I and the following Example 2 which refers to FIG. 2 and Table II. All following ratios and percentages, where applicable, are on a pound-mole basis.

In these examples, n-pentane is the illustrative solvent, but it should be understood that any physical solvent for hydrocarbons, from butane to decane, is suitable for use in the process of this invention. Moreover, any of the paraffinic, naphthenic, and lighter aromatic solvents described in the Mehra patents which have been incorporated by reference hereinbefore, but without limitations as to molecular weights and/or UOP characterization factors, are satisfactory for practicing this invention.

TABLE I

KTI/AET Ethylene Process for Slip Stream Hydrogen Production

| Stream | | 27 | 31 | 32 | 33 | 34 | 36 | 37 |
|---|---|---|---|---|---|---|---|---|
| Temperature | F. | 7 | −28 | −94 | 115 | −28 | −28 | 78 |
| Pressure | psia | 445 | 440 | 436 | 448 | 440 | 440 | 70 |
| Hydrogen | lb mole/hr | 2,106.10 | 2,141.67 | 0.14 | 0.00 | 454.27 | 1,687.40 | 1,687.26 |
| Methane | lb mole/hr | 3,905.41 | 4,965.54 | 9.80 | 0.75 | 1,053.03 | 3,912.51 | 3,902.36 |
| CO | lb mole/hr | 66.13 | 76.31 | 0.04 | 0.00 | 16.19 | 60.13 | 60.09 |
| Ethylene | lb mole/hr | 4,763.36 | 552.80 | 9.56 | 4,337.94 | 117.60 | 435.21 | 9.44 |
| Ethane | lb mole/hr | 647.20 | 6.17 | 0.20 | 642.98 | 1.38 | 4.79 | 0.01 |
| M-Acetylene | lb mole/hr | 7.09 | 0.11 | 0.04 | 9.90 | 0.03 | 0.09 | 0.00 |
| Propadiene | lb mole/hr | 25.78 | 0.48 | 0.12 | 33.21 | 0.11 | 0.37 | 0.00 |
| Propene | lb mole/hr | 1,202.52 | 16.01 | 2.57 | 1,350.09 | 3.42 | 12.59 | 0.00 |
| Propane | lb mole/hr | 22.61 | 0.39 | 0.08 | 27.19 | 0.08 | 0.31 | 0.00 |
| 13-Butadiene | lb mole/hr | 0.02 | 0.00 | 0.00 | 0.06 | 0.00 | 0.00 | 0.00 |
| i-Butene | lb mole/hr | 0.21 | 0.01 | 0.00 | 0.50 | 0.00 | 0.01 | 0.00 |
| 1-Butene | lb mole/hr | 0.41 | 0.01 | 0.01 | 1.00 | 0.00 | 0.01 | 0.00 |
| tr2-butene | lb mole/hr | 0.00 | 0.00 | 0.00 | 0.01 | 0.00 | 0.00 | 0.00 |
| n-butane | lb mole/hr | 0.01 | 0.00 | 0.00 | 0.04 | 0.00 | 0.00 | 0.00 |
| n-Pentane | lb mole/hr | 0.00 | 18.37 | 12.50 | 5,651.88 | 6.20 | 12.18 | 0.00 |
| Total Flow | lb mole/hr | 12,746.86 | 7,777.88 | 35.07 | 12,055.55 | 1,652.30 | 6,125.58 | 5,659.15 |

| Stream | | 38 | 39 | 40 | 42 | 55 | 57 |
|---|---|---|---|---|---|---|---|
| Temperature | F. | −41 | −20 | −33 | 19 | 22 | −58 |
| Pressure | psia | 439 | 272 | 433 | 245 | 245 | 473 |
| Hydrogen | lb mole/hr | 35.43 | 0.00 | 418.85 | 0.00 | 0.00 | 0.00 |
| Methane | lb mole/hr | 1,051.07 | 0.35 | 1.95 | 1.10 | 0.75 | 0.00 |
| CO | lb mole/hr | 10.14 | 0.00 | 6.05 | 0.00 | 0.00 | 0.00 |
| Ethylene | lb mole/hr | 117.81 | 416.20 | 0.01 | 4,755.59 | 4,337.71 | 0.23 |
| Ethane | lb mole/hr | 1.74 | 4.58 | 0.01 | 647.53 | 642.61 | 0.37 |
| M-Acetylene | lb mole/hr | 2.89 | 0.05 | 0.00 | 7.09 | 7.04 | 2.86 |
| Propadiene | lb mole/hr | 7.78 | 0.25 | 0.01 | 25.79 | 25.52 | 7.69 |
| Propene | lb mole/hr | 161.01 | 10.02 | 0.41 | 1,202.25 | 1,192.09 | 158.00 |
| Propane | lb mole/hr | 4.89 | 0.23 | 0.01 | 22.61 | 22.37 | 4.82 |
| 13-Butadiene | lb mole/hr | 0.04 | 0.00 | 0.00 | 0.02 | 0.02 | 0.04 |
| i-Butene | lb mole/hr | 0.28 | 0.00 | 0.00 | 0.22 | 0.21 | 0.28 |
| 1-Butene | lb mole/hr | 0.59 | 0.00 | 0.00 | 0.42 | 0.41 | 0.59 |
| tr2-butene | lb mole/hr | 0.01 | 0.00 | 0.00 | 0.00 | 0.00 | 0.01 |
| n-butane | lb mole/hr | 0.03 | 0.00 | 0.00 | 0.02 | 0.02 | 0.03 |
| n-Pentane | lb mole/hr | 5,657.75 | 0.83 | 0.23 | 0.93 | 0.10 | 5,651.78 |
| Total Flow | lb mole/hr | 7,051.47 | 432.51 | 427.52 | 6,663.58 | 6,228.86 | 5,826.68 |

TABLE II

KTI/AET Ethylene Process for Full Stream Hydrogen Production

| Stream | | 27 | 31 | 32 | 33 | 37 | 38 | 39 | 40 |
|---|---|---|---|---|---|---|---|---|---|
| Temperature | F. | 8 | −28 | −82 | 127 | 86 | −31 | −2 | 1 |
| Pressure | psia | 434 | 425 | 341 | 433 | 55 | 424 | 257 | 418 |
| Hydrogen | lb mole/hr | 2,077.87 | 2,112.04 | 0.05 | 0.00 | 111.22 | 153.14 | 0.00 | 1,966.65 |
| Methane | lb mole/hr | 3,853.94 | 5,313.45 | 36.15 | 0.75 | 3,420.01 | 6,390.39 | 0.35 | 432.83 |
| CO | lb mole/hr | 65.51 | 72.40 | 0.06 | 0.00 | 19.83 | 30.67 | 0.00 | 45.68 |
| Ethylene | lb mole/hr | 4,695.72 | 216.05 | 10.85 | 4,573.09 | 10.47 | 370.50 | 119.39 | 1.61 |
| Ethane | lb mole/hr | 638.78 | 2.94 | 0.80 | 640.81 | 0.04 | 18.69 | 5.25 | 0.79 |
| M-Acetylene | lb mole/hr | 6.65 | 0.02 | 0.52 | 8.30 | 0.00 | 5.15 | 0.22 | 0.01 |
| Propadiene | lb mole/hr | 25.05 | 0.13 | 1.44 | 29.83 | 0.00 | 15.55 | 1.03 | 0.07 |
| Propene | lb mole/hr | 1,173.31 | 7.46 | 40.14 | 1,307.93 | 0.00 | 457.43 | 48.15 | 3.42 |
| Propane | lb mole/hr | 22.10 | 0.14 | 0.98 | 25.42 | 0.00 | 11.12 | 0.96 | 0.06 |
| 13-Butadiene | lb mole/hr | 0.02 | 0.00 | 0.00 | 0.04 | 0.00 | 0.07 | 0.00 | 0.00 |
| i-Butene | lb mole/hr | 0.23 | 0.00 | 0.05 | 0.45 | 0.00 | 0.78 | 0.01 | 0.00 |
| 1-Butene | lb mole/hr | 0.35 | 0.00 | 0.08 | 0.71 | 0.00 | 1.30 | 0.01 | 0.00 |
| tr2-butene | lb mole/hr | 0.00 | 0.00 | 0.00 | 0.01 | 0.00 | 0.02 | 0.00 | 0.00 |
| n-butane | lb mole/hr | 0.02 | 0.00 | 0.01 | 0.07 | 0.00 | 0.15 | 0.00 | 0.00 |
| n-Pentane | lb mole/hr | 0.00 | 18.96 | 31.47 | 6,984.20 | 0.00 | 31,178.08 | 0.74 | 2.67 |

TABLE II-continued
KTI/AET Ethylene Process for Full Stream Hydrogen Production

| Molar Flow | lb mole/hr | 12,559.56 | 7,743.57 | 122.59 | 13,571.60 | 3,561.57 | 38,633.02 | 176.11 | 2,453.77 |
|---|---|---|---|---|---|---|---|---|---|
| Stream | | 42 | 46 | 48 | 55 | 57 | 61 | 62 | |
| Temperature | F. | 18 | −31 | −31 | 18 | −45 | 11 | −40 | |
| Pressure | psia | 230 | 424 | 424 | 230 | 458 | 345 | 341 | |
| Hydrogen | lb mole/hr | 0.00 | 119.01 | 34.13 | 0.00 | 0.00 | 111.27 | 7.74 | |
| Methane | lb mole/hr | 1.10 | 4,966.29 | 1,424.10 | 0.75 | 0.00 | 3,456.51 | 1,509.77 | |
| CO | lb mole/hr | 0.00 | 23.83 | 6.83 | 0.00 | 0.00 | 19.89 | 3.95 | |
| Ethylene | lb mole/hr | 4,683.65 | 287.93 | 82.57 | 4,564.26 | 8.83 | 140.70 | 147.23 | |
| Ethane | lb mole/hr | 637.95 | 14.53 | 4.17 | 632.70 | 8.11 | 6.09 | 8.43 | |
| M-Acetylene | lb mole/hr | 6.64 | 4.01 | 1.15 | 6.42 | 1.88 | 0.74 | 3.26 | |
| Propadiene | lb mole/hr | 24.99 | 12.08 | 3.47 | 23.96 | 5.87 | 2.47 | 9.61 | |
| Propene | lb mole/hr | 1,169.90 | 355.49 | 101.94 | 1,121.75 | 186.19 | 88.29 | 267.20 | |
| Propane | lb mole/hr | 22.03 | 8.64 | 2.48 | 21.07 | 4.34 | 1.94 | 6.70 | |
| 13-Butadiene | lb mole/hr | 0.02 | 0.06 | 0.02 | 0.02 | 0.02 | 0.01 | 0.05 | |
| i-Butene | lb mole/hr | 0.23 | 0.60 | 0.17 | 0.22 | 0.23 | 0.06 | 0.54 | |
| 1-Butene | lb mole/hr | 0.34 | 1.01 | 0.29 | 0.33 | 0.38 | 0.10 | 0.91 | |
| tr2-butene | lb mole/hr | 0.00 | 0.01 | 0.00 | 0.00 | 0.00 | 0.00 | 0.01 | |
| n-butane | lb mole/hr | 0.02 | 0.12 | 0.03 | 0.02 | 0.04 | 0.01 | 0.11 | |
| n-Pentane | lb mole/hr | 0.84 | 24,206.40 | 6,971.68 | 0.10 | 6,984.10 | 32.21 | 24,177.69 | |
| Molar Flow | lb mole/hr | 6,547.71 | 30,000.00 | 8,633.02 | 6,371.60 | 7,200.00 | 3,860.28 | 26,143.22 | |

EXAMPLE 1

With overhead stream 31 being divided so that 21.24 per cent is fed to methane absorber 30 as stream 34, the remainder being fed directly to auto refrigerated recovery unit 35 as stream 36, and with all of rich solvent stream 38 being fed to the top of demethanizing absorber 29, this slipstream embodiment recovers, in stream 40, 19.89% of the incoming hydrogen in stream 27 and 92.2% of the hydrogen entering methane absorber 30 in stream 34. The purity of the hydrogen in stream 40 is about 98 mol %. None of the 2,106.10 lbmoles/hr of hydrogen entering absorber 29 are lost to rich solvent stream 33.

Inspection of Table I reveals that the selected splitting ratio for stream 31 of stream 36 to stream 34 is 3.7:1.0. It is also worth noting that absorber 29 is operated at 115° F. at its bottom and at −28° F. at its top while handling 12,746.86 lbmoles/hr of feedstock, and recovering over 91% of ethylene present in feed stream 27 along with 5,651.78 lbmoles/hr of pure n-pentane, used herein as an illustration of one of several suitable solvents.

Continuing with the characteristics of the invention with respect to fuel gas product stream 37 as illustrated in Table I for this slipstream example, auto refrigerated recovery unit 35 recovers 95.63% of the ethylene present in stream 36 as stream 39 which is demethanized to contain 0.08 mol % methane. The overall solvent loss for the process of this example is 1.16 lbmoles/hr and exists in streams 40 and 42. No solvent is lost in stream 37 to the fuel gas system. It is of commercial importance that product stream 42 of C₂ and C₃ hydrocarbons contains only 231 parts per million by molar volume of methane in ethylene.

Recirculating solvent stream 57 is 97.00 mol % pure n-pentane. The ratio of pure pentane in solvent stream 57 to inlet gas feed stream 27, in order to have a total ethylene recovery of 99.84%, is 0.44 on a molar basis. For this example, solvent flow of stream 59 is identical to stream 57, and solvent flow in stream 58 is zero.

EXAMPLE 2

This example illustrates selective full stream recovery of hydrogen at a level of 100%. With all of overhead stream 31 being fed to methane absorber 30 and with rich solvent stream 38 being split into stream 48 which is fed to demethanizing absorber 29 and stream 46 which is fed to methane stripper 60, this fullstream embodiment recovers, in stream 40, 94.65% of the incoming hydrogen in stream 27 and 93.12% of the hydrogen entering methane absorber 30 in stream 31. The purity of the hydrogen in stream 40 is 80.15%.

Inspection of Table II reveals that the selected splitting ratio for stream 38 into stream 46 and stream 48 is 3.5:1.0. It is also worth noting that demethanizing absorber 29 is operated at 127° F. at its bottom and at −28° F. at its top while handling 12,559.56 lbmoles/hr of feedstock, and while utilizing 6,984.2 lbmoles/hr of pure n-pentane in demethanizing absorber 29 to recover 97.4% of the ethylene in stream 27 as a component of stream 33. The ratio of pentane in stream 62 to pentane in stream 57 is 3.5:1.0. This split ratio is identical to the splitting ratio of rich solvent stream 38 into streams 48 and 46.

Continuing with the characteristics of the invention with respect to fuel gas product stream 37, as illustrated in Table II for this fullstream example, auto refrigerated recovery unit 35 allows only 0.22% of the ethylene in feed stream 27 to enter the fuel gas system through stream 37.

Recirculating solvent stream 57 is 97.00% pure solvent. On a molar basis, the solvent in stream 57 is 55.61% of the incoming materials in stream 27, and the entire process recovers about 99.7% of incoming ethylene into stream 42.

Auto refrigerated recovery unit 35, requiring no external refrigeration for condensation and demethanization of ethylene plus hydrocarbons in its bottom stream 39, consequently also requires relatively little capital investment due to its significantly reduced size. In illustration, the flow rate of feed, on a molar basis, to auto refrigerated recovery unit 35 is 48% of the flow rate to demethanizing absorber 29 in Example 1 and 31% in Example 2.

For cracked gases, auto refrigeration is achieved through the use of turbo expanders which in turn provide chilling for demethanization and recovery of 1–25% of ethylene in feed stream 27 through demethanizing absorber 29. When FCC refinery off-gases are fed to demethanizing absorber 29, the turbo expanders in auto refrigerated recovery unit 35 are replaced by pressure let-down valves to achieve the Joule-Thompson effect while limiting the chilling to a temperature no lower than −200° F. This limitation ensures the safety aspects of the process, particularly by preventing the condensation of nitrogen oxides within the system.

Most refinery off-gases contain nitrogen which is generally not present in a cracked gas stream. When nitrogen is present in the feed to demethanizing absorber 29, the hydrogen purity of stream 40 is limited by the nitrogen content of the feed since the process of this invention does not separate nitrogen from hydrogen.

Because it will be readily apparent to those skilled in the art of treating refinery off-gases and cracked hydrocarbon gases containing substantial quantities of hydrogen and olefins that innumerable variations, modifications, applications, and extensions of the examples and principles hereinbefore set forth can be made without departing from the spirit and the scope of the invention, what is hereby defined as such scope and is desired to be protected should be measured, and the invention should be limited, only by the following claims.

What is claimed is:

1. A process for recovering ethylene and a selected proportion of hydrogen from a stream of feedstock gases selected from the group consisting of cracked hydrocarbon gases and refinery off-gases, comprising removing at least 75% of said ethylene in a solvent-based, demethanizing absorber, prior to an auto refrigerated recovery unit which recovers the remainder of said ethylene from said feedstock gases, and recovering said selected proportion of hydrogen as the overhead stream from a methane absorber which receives a selected portion of overhead gases from said demethanizing absorber and removes methane therefrom in a rich solvent bottom stream.

2. The process of claim 1, wherein said overhead gases are selectively split, into a hydrogen portion stream and a fuel portion stream, said hydrogen portion stream being fed to said methane absorber and said fuel portion stream being fed to said auto refrigerated recovery unit.

3. The process of claim 2, wherein said demethanizing absorber also produces a rich solvent bottom stream that is fed to a solvent regenerator which produces an overhead stream of $C_2$ and/or $C_3$ hydrocarbons and a lean solvent bottom stream which is selectively split into a methane portion stream and an ethylene portion stream, said methane portion stream being fed to said methane absorber and said ethylene portion stream being fed to said demethanizing absorber.

4. The process of claim 3, wherein said auto refrigerated recovery unit produces a product stream of fuel gases, a stream of recovered solvent which is recycled to said demethanizing absorber, and a stream of $C_2$ and/or $C_3$ hydrocarbons which is combined with said overhead stream of $C_2$ and/or $C_3$ hydrocarbons from said solvent regenerator to form an ethylene and heavier product stream.

5. The process of claim 4, wherein said methane absorber produces an overhead stream containing said selected proportion of hydrogen and a rich solvent bottom stream which is selectively split into an absorber portion stream and a stripper portion stream, said absorber portion stream being fed to said demethanizing absorber and said stripper portion stream being fed to a methane stripper.

6. The process of claim 5, wherein said methane stripper produces a bottom solvent stream which is fed to said methane absorber and an overhead stream which is fed to said auto refrigerated recovery unit.

7. The process of claim 6, wherein said auto refrigerated recovery unit requires no external refrigeration for condensation and demethanization of ethylene-plus hydrocarbons.

8. The process of claim 7, wherein said feedstock gases are cracked gases and wherein auto refrigeration is achieved through use of turbo expanders which in turn provide chilling for demethanization and recovery of 1-25% of ethylene in said feedstock.

9. The process of claim 7, wherein said feedstock gases are FCC refinery off-gases and wherein refrigeration is provided h use of pressure let-down valves which in turn provide chilling to achieve the Joule-Thompson effect while limiting said chilling to a temperature no lower than −100° F., whereby nitrogen oxides are prevented from condensing.

10. In a process for recovering substantially all ethylene and heavier hydrocarbons and a selected proportion of hydrogen within a gas stream selected from the group consisting of refinery off-gases and cracked hydrocarbon gases containing said ethylene and heavier hydrocarbons and said hydrogen, said gas stream having been sweetened, compressed, and dehydrated, the improvement comprising:

A. feeding said gas stream to an intercooled and reboiled demethanizing absorber which produces an overhead stream and a rich solvent bottom stream;

B. selectively splitting said overhead stream of Step A into a hydrogen portion stream which is fed to a methane absorber and a fuel portion stream which is fed to an auto refrigerated recovery unit;

C. feeding said rich solvent bottom stream of Step A to a solvent regenerator which produces an overhead stream of said ethylene and heavier hydrocarbons and a bottom stream of lean solvent;

D. selectively splitting said bottom stream of Step C into a methane portion stream which is fed to said methane absorber and an ethylene portion stream which is fed to said demethanizing absorber;

E. producing from said methane absorber an overhead stream containing said selected proportion of hydrogen and a rich solvent bottom stream;

F. selectively splitting said rich solvent bottom stream of Step E into an absorber portion stream which is fed to said demethanizing absorber and a stripper portion stream which is fed to a methane stripper;

G. producing from said methane stripper an overhead stream which is fed to said auto refrigerated recovery unit and a bottom stream which is fed to said methane absorber;

H. producing from said auto refrigerated recovery unit a stream of fuel gases, a recovered solvent stream which is recycled to said demethanizing absorber, and a stream of ethylene and heavier hydrocarbons; and I. combining said overhead stream of said ethylene and heavier hydrocarbons of Step C with said stream of said ethylene and heavier hydrocarbons of Step H to form an ethylene and heavier product stream.

11. A process for recovery of up to 100% of the hydrogen and substantially all of the ethylene and heavier hydrocarbons from a cooled, sweetened, and compressed hydrocarbon gas stream containing hydrogen, methane, carbon monoxide, ethane, ethylene, acetylene, and the $C_3$ and heavier hydrocarbons characteristic of an ethylene plant cracked gas and/or a refinery off-gas stream, said stream having been additionally pretreated through a heat-pumped front-end deethanizer or depropanizer and selectively catalytically hydrogenated to significantly reduce the acetylene and diolefins content thereof and then dehydrated, said process comprising:

A. feeding said gas stream to an intercooled and reboiled demethanizing absorber and producing therefrom a bottom stream of rich solvent containing most of said ethylene and heavier hydrocarbons present in said treated gas stream and an overhead stream containing said hydrogen, said methane, said carbon monoxide, and the remainder of said ethylene and heavier hydrocarbons;
B. feeding said rich solvent bottom stream of Step A to a solvent regenerator and obtaining therefrom a bottom stream of lean solvent and an overhead hydrocarbon stream of said ethylene and heavier hydrocarbons;
C. selectively splitting said overhead stream of Step A into a hydrogen portion stream and a fuel portion stream;
D. feeding said hydrogen portion stream to a methane absorber and feeding said fuel portion stream to an auto refrigerated recovery unit;
E. producing from said methane absorber a hydrogen product overhead stream and a rich solvent bottom stream;
F. selectively splitting said rich solvent bottom stream of Step E into an absorber portion stream and a stripper portion stream;
G. feeding said absorber portion stream to said demethanizing absorber and feeding said stripper portion stream to a methane stripper;
H. producing from said methane stripper an overhead stream which is fed to said auto refrigerated recovery unit and a bottom stream which is fed to said methane absorber;
I. producing from said auto refrigerated recovery unit a fuel gas stream of hydrogen, methane, and carbon monoxide having less than 0.5 mol % of said ethylene in said treated gas stream, a recovered solvent stream which is recycled to said demethanizing absorber, and a stream containing substantially all of said remainder of ethylene and heavier hydrocarbons;
J. combining said ethylene and heavier hydrocarbons stream of Step I with said overhead hydrocarbon stream of Step B to form an ethylene and heavier product stream;
K. selectively splitting said lean solvent bottom stream of Step B into a methane portion stream and an ethylene portion stream; and
L. feeding said ethylene portion stream of Step K to said demethanizing absorber and feeding said methane portion stream of Step K to said methane absorber.

12. A process for recovering up to 50 per cent of the hydrogen and substantially all of the olefins from a sweetened, compressed, and dried hydrocarbon gas stream containing hydrogen, methane, carbon monoxide, ethane, ethylene, acetylene, and the $C_3$ and heavier hydrocarbons characteristic of an ethylene plant cracked gas and/or a refinery off-gas stream, said process comprising:

A. feeding said gas stream to an intercooled and reboiled demethanizing absorber and producing therefrom a bottom stream of rich solvent containing most of said ethylene and heavier hydrocarbons present in said treated gas stream and an overhead stream containing said hydrogen, said methane, said carbon monoxide, and the remainder of said ethylene and heavier hydrocarbons;
B. selectively splitting said overhead stream into a hydrogen portion stream and a fuel portion stream;
C. feeding said hydrogen portion stream to a methane absorber and feeding said fuel portion stream to an auto refrigerated recovery unit and producing therefrom a fuel gas stream of hydrogen, methane, and carbon monoxide having less than 0.5 mol % of said ethylene, a recovered stream of lean solvent which is recycled to said demethanizing absorber, and a stream containing substantially all of said ethylene and heavier hydrocarbons in said fuel portion stream;
D. feeding said rich solvent bottom of Step A to a solvent regenerator and obtaining therefrom a bottom stream of lean solvent which is fed to said methane absorber and an overhead hydrocarbon stream of said ethylene and heavier hydrocarbons;
E. combining said product stream of Step C with said overhead hydrocarbon stream of Step D to form an ethylene and heavier product stream;
F. producing a hydrogen product overhead stream and a rich solvent bottom stream from said methane absorber; and
G. feeding said rich solvent bottom stream of Step F to the top of said demethanizing absorber.

13. The process of claim 12, wherein ethylene, ethane, propene, and propane are produced from said ethylene and heavier product stream.

14. The process of claim 12, wherein said hydrocarbon gas feed stream is a cracked gas stream, and said ethane and said propane are recycled for cracking.

15. The process of claim 12, wherein said hydrocarbon gas feed stream is a refinery off-gas stream and said ethane and said propane are used as fuel.

16. The process of claim 12, wherein said hydrocarbon gas feed stream is a refinery off-gas stream and said ethane and said propane are disposed of as products.

17. A process for recovering from 20% to 100% of the hydrogen and substantially all of the ethylene from a sweetened, compressed, and dried hydrocarbon gas stream containing hydrogen, methane, carbon monoxide, ethylene, ethane, acetylene, and the $C_3$ and heavier hydrocarbons characteristic of an ethylene plant cracked gas and/or a refinery off-gas, said process comprising:

A. feeding said treated gas stream to an intercooled and reboiled demethanizing absorber and producing therefrom a bottom stream of rich solvent containing most of said ethylene and heavier hydrocarbons present in said treated gas stream and an overhead stream containing said hydrogen, said methane, said carbon monoxide, and the remainder of said ethylene and heavier hydrocarbons;
B. feeding all of said overhead stream to a methane absorber which produces an overhead stream as hydrogen product and a rich solvent bottom stream;
C. splitting said rich solvent stream of Step B into an absorber portion stream and a stripper portion stream;

D. feeding said stripper portion stream to a methane stripper which produces an overhead stream and a bottom stream;

E. feeding said bottom stream of Step D to said methane absorber and feeding said overhead stream of Step D to an auto refrigerated recovery unit which is internally refrigerated and producing therefrom a fuel gas stream of methane and carbon monoxide having less than about 0.5 mol % of said ethylene, a stream containing substantially all of the remainder of said ethylene and heavier hydrocarbons, and a stream of recovered solvent which is recycled to said demethanizing absorber;

F. feeding said rich solvent bottom stream of Step A to a solvent regenerator and obtaining therefrom a bottom stream of lean solvent which is recycled to the top of said methane absorber and an overhead stream of said ethylene and heavier hydrocarbons; and G. combining said overhead hydrocarbon stream of Step F with said stream of Step E containing substantially all of the remainder of said ethylene and heavier hydrocarbons to form a combined ethylene and heavier product stream.

18. The process of claim 17, wherein said hydrocarbon gas feed stream is a cracked gas stream and said ethane and propane are recycled for cracking.

19. The process of claim 17, wherein said hydrocarbon gas feed stream is a cracked gas stream and said ethane and propane are used as fuel.

20. The process of claim 17, wherein said hydrocarbon gas feed stream is a cracked gas stream and said ethane and propane are disposed of as products.

* * * * *

UNITED STATES PATENT AND TRADEMARK OFFICE
CERTIFICATE OF CORRECTION

PATENT NO. : 5,326,929
DATED : July 5, 1994
INVENTOR(S) : Yuv R. Mehra, Wilfred K. Lam and Don W. Mullins It is certified that error appears in the above-indentified patent and that said Letters Patent is hereby corrected as shown below:

On the cover sheet, under

[75] Inventors:

the third inventor's name should be changed from "Dow" to --Don--

On the cover sheet, under

[73] Assignee:

the second Assignee should be added as follows:

--Kinetics Technology International Corporation
San Dimas, California--

Col. 1, line 15, after "hydrogen" insert --from--

Col. 5, line 48, after "$C_2$" insert a plus sign (--+--)

UNITED STATES PATENT AND TRADEMARK OFFICE
CERTIFICATE OF CORRECTION

PATENT NO. : 5,326,929

DATED : July 5, 1994

INVENTOR(S) : Yuv R. Mehra, Wilfred K. Lam and Don W. Mullins

It is certified that error appears in the above-indentified patent and that said Letters Patent is hereby corrected as shown below:

Bridging cols. 9 and 10, Table II should be corrected to read as follows:

TABLE II

| KTI/AET Ethylene Process for Full Stream Hydrogen Production | | | | | | | | | |
|---|---|---|---|---|---|---|---|---|---|
| Stream | | 27 | 31 | 32 | 33 | 37 | 38 | 39 | 40 |
| Temperature | F. | 8 | −28 | −82 | 127 | 86 | −31 | −2 | 1 |
| Pressure | psia | 434 | 425 | 341 | 433 | 55 | 424 | 257 | 418 |
| Hydrogen | lb mole/hr | 2,077.87 | 2,112.04 | 0.05 | 0.00 | 111.22 | 153.14 | 0.00 | 1,966.65 |
| Methane | lb mole/hr | 3,853.94 | 5,313.45 | 36.15 | 0.75 | 3,420.01 | 6,390.39 | 0.35 | 432.83 |
| CO | lb mole/hr | 65.51 | 72.40 | 0.06 | 0.00 | 19.83 | 30.67 | 0.00 | 45.68 |
| Ethylene | lb mole/hr | 4,695.72 | 216.05 | 10.85 | 4,573.09 | 10.47 | 370.50 | 119.39 | 1.61 |
| Ethane | lb mole/hr | 638.78 | 2.94 | 0.80 | 640.81 | 0.04 | 18.69 | 5.25 | 0.79 |
| M-Acetylene | lb mole/hr | 6.65 | 0.02 | 0.52 | 8.30 | 0.00 | 5.15 | 0.22 | 0.01 |
| Propadiene | lb mole/hr | 25.05 | 0.13 | 1.44 | 29.83 | 0.00 | 15.55 | 1.03 | 0.07 |
| Propene | lb mole/hr | 1,173.31 | 7.46 | 40.14 | 1,307.93 | 0.00 | 457.43 | 48.15 | 3.42 |
| Propane | lb mole/hr | 22.10 | 0.14 | 0.98 | 25.42 | 0.00 | 11.12 | 0.96 | 0.06 |
| 13-Butadiene | lb mole/hr | 0.02 | 0.00 | 0.00 | 0.04 | 0.00 | 0.07 | 0.00 | 0.00 |
| i-Butene | lb mole/hr | 0.23 | 0.00 | 0.05 | 0.45 | 0.00 | 0.78 | 0.01 | 0.00 |
| 1-Butene | lb mole/hr | 0.35 | 0.00 | 0.08 | 0.71 | 0.00 | 1.30 | 0.01 | 0.00 |
| tr2-butene | lb mole/hr | 0.00 | 0.00 | 0.00 | 0.01 | 0.00 | 0.02 | 0.00 | 0.00 |
| n-butane | lb mole/hr | 0.02 | 0.00 | 0.01 | 0.07 | 0.00 | 0.15 | 0.00 | 0.00 |
| n-Pentane | lb mole/hr | 0.00 | 18.96 | 31.47 | 6,984.20 | 0.00 | 31,178.08 | 0.74 | 2.67 |
| Molar Flow | lb mole/hr | 12,559.56 | 7,743.57 | 122.59 | 13,571.60 | 3,561.57 | 38,633.02 | 176.11 | 2,453.77 |

UNITED STATES PATENT AND TRADEMARK OFFICE
CERTIFICATE OF CORRECTION

PATENT NO. : 5,326,929
DATED : July 5, 1994
INVENTOR(S) : Yuv R. Mehra, Wilfred K. Lam and Don W. Mullins It is certified that error appears in the above-indentified patent and that said Letters Patent is hereby corrected as shown below:

Bridging cols. 11 and 12, Table II-continued should be corrected to read as follows:

TABLE II-continued

| KTI/AET Ethylene Process for Full Stream Hydrogen Production | | | | | | | | |
|---|---|---|---|---|---|---|---|---|
| Stream | | 42 | 46 | 48 | 55 | 57 | 61 | 62 |
| Temperature | F. | 18 | −31 | −31 | 18 | −45 | 11 | −40 |
| Pressure | psia | 230 | 424 | 424 | 230 | 458 | 345 | 341 |
| Hydrogen | lb mole/hr | 0.00 | 119.01 | 34.13 | 0.00 | 0.00 | 111.27 | 7.74 |
| Methane | lb mole/hr | 1.10 | 4,966.29 | 1,424.10 | 0.75 | 0.00 | 3,456.51 | 1,509.77 |
| CO | lb mole/hr | 0.00 | 23.83 | 6.83 | 0.00 | 0.00 | 19.89 | 3.95 |
| Ethylene | lb mole/hr | 4,683.65 | 287.93 | 82.57 | 4,564.26 | 8.83 | 140.70 | 147.23 |
| Ethane | lb mole/hr | 637.95 | 14.53 | 4.17 | 632.70 | 8.11 | 6.09 | 8.43 |
| M-Acetylene | lb mole/hr | 6.64 | 4.01 | 1.15 | 6.42 | 1.88 | 0.74 | 3.26 |
| Propadiene | lb mole/hr | 24.99 | 12.08 | 3.47 | 23.96 | 5.87 | 2.47 | 9.61 |
| Propene | lb mole/hr | 1,169.90 | 355.49 | 101.94 | 1,121.75 | 186.19 | 88.29 | 267.20 |
| Propane | lb mole/hr | 22.03 | 8.64 | 2.48 | 21.07 | 4.34 | 1.94 | 6.70 |
| 13-Butadiene | lb mole/hr | 0.02 | 0.06 | 0.02 | 0.02 | 0.02 | 0.01 | 0.05 |
| i-Butene | lb mole/hr | 0.23 | 0.60 | 0.17 | 0.22 | 0.23 | 0.06 | 0.54 |
| 1-Butene | lb mole/hr | 0.34 | 1.01 | 0.29 | 0.33 | 0.38 | 0.10 | 0.91 |
| tr2-butene | lb mole/hr | 0.00 | 0.01 | 0.00 | 0.00 | 0.00 | 0.00 | 0.01 |
| n-butane | lb mole/hr | 0.02 | 0.12 | 0.03 | 0.02 | 0.04 | 0.01 | 0.11 |
| n-Pentane | lb mole/hr | 0.84 | 24,206.40 | 6,971.68 | 0.10 | 6,984.10 | 32.21 | 24,177.69 |
| Molar Flow | lb mole/hr | 6,547.71 | 30,000.00 | 8,633.02 | 6,371.60 | 7,200.00 | 3,860.28 | 26,143.22 |

UNITED STATES PATENT AND TRADEMARK OFFICE
CERTIFICATE OF CORRECTION

PATENT NO. : 5,326,929
DATED : July 5, 1994
INVENTOR(S) : Yuv R. Mehra, Wilfred K. Lam and Don W. Mullins It is certified that error appears in the above-indentified patent and that said Letters Patent is hereby corrected as shown below:

Col. 13, line 2, delete "--200°F." and insert -- -100°F.--

Col. 14, line 14 (claim 9), delete "h" and insert --through--

Col. 15, line 9 (claim 11), after "said" insert --treated--

Signed and Sealed this

Second Day of May, 1995

Attest:

BRUCE LEHMAN

Attesting Officer

Commissioner of Patents and Trademarks